(12) United States Patent
Yoshida et al.

(10) Patent No.: US 12,073,608 B2
(45) Date of Patent: Aug. 27, 2024

(54) LEARNING DEVICE, LEARNING METHOD AND RECORDING MEDIUM

(71) Applicant: NEC Corporation, Tokyo (JP)

(72) Inventors: Shuhei Yoshida, Tokyo (JP); Makoto Terao, Tokyo (JP)

(73) Assignee: NEC CORPORATION, Tokyo (JP)

(*) Notice: Subject to any disclaimer, the term of this patent is extended or adjusted under 35 U.S.C. 154(b) by 356 days.

(21) Appl. No.: 17/641,875

(22) PCT Filed: Sep. 27, 2019

(86) PCT No.: PCT/JP2019/038343
§ 371 (c)(1),
(2) Date: Mar. 10, 2022

(87) PCT Pub. No.: WO2021/059527
PCT Pub. Date: Apr. 1, 2021

(65) Prior Publication Data
US 2022/0335712 A1     Oct. 20, 2022

(51) Int. Cl.
*G06K 9/62* (2022.01)
*G06N 20/00* (2019.01)
*G06T 7/00* (2017.01)
*G06V 10/77* (2022.01)
*G06V 10/776* (2022.01)
*G06V 10/778* (2022.01)

(52) U.S. Cl.
CPC ............ *G06V 10/778* (2022.01); *G06N 20/00* (2019.01); *G06T 7/00* (2013.01); *G06V 10/77* (2022.01); *G06V 10/776* (2022.01)

(58) Field of Classification Search
None
See application file for complete search history.

(56) References Cited

U.S. PATENT DOCUMENTS

| | | | |
|---|---|---|---|
| 10,558,932 B1* | 2/2020 | Neven | G06N 20/00 |
| 11,861,466 B1* | 1/2024 | Neven | G06N 7/01 |
| 2018/0330275 A1* | 11/2018 | Jain | G06N 5/04 |
| 2020/0193220 A1* | 6/2020 | Chen | G06N 5/04 |

FOREIGN PATENT DOCUMENTS

JP     2018-200524 A     12/2018

OTHER PUBLICATIONS

International Search Report for PCT Application No. PCT/JP2019/038343, mailed on Dec. 3, 2019.

(Continued)

*Primary Examiner* — Feng Niu
(74) *Attorney, Agent, or Firm* — Sughrue Mion, PLLC

(57) ABSTRACT

The dataset supply unit supplies a learning dataset. The recognition unit outputs the recognition result for the recognition object data in the supplied learning dataset. Further, the intersection matrix computation unit computes the intersection matrix based on the learning dataset. The recognition loss computation unit computes the recognition loss using the recognition result, the intersection matrix, and the correct answer data given to the recognition object data. Then, the updating unit updates the parameters of the recognition unit based on the recognition loss.

7 Claims, 11 Drawing Sheets

(56) References Cited

OTHER PUBLICATIONS

Jesus Cid-Sueiro et al.,"Consistency of losses for learning from weak labels", ECML PKDD 2014, Part I, LNCS 8724, pp. 197-210, 2014.

Abdollahpour Zeinab et al., "Image Classification Using Ontology Based Improved Visual Words", 2015 23rd Iranian Conference on Electrical Engineering, IEEE [online], Jul. 2, 2015, [retrieved on Nov. 20, 2019], Retrieved from the Internet:<URL:https://Ieeexplore.ieee.org/abstract/document/7146303>, pp. 694-698.

* cited by examiner

<NORMAL DATASET>

<EXPERT DATASET>

FIG. 2A
<NORMAL DATASET>
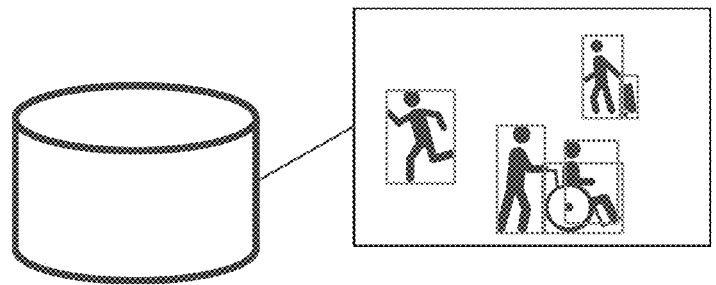
FIG. 2B
<EXPERT DATASET>
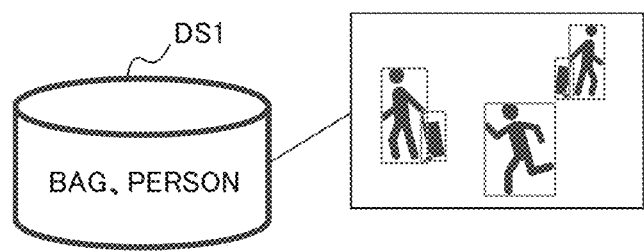
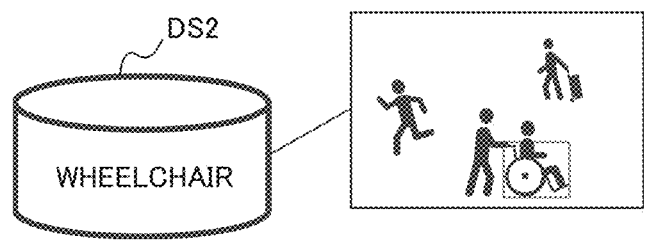

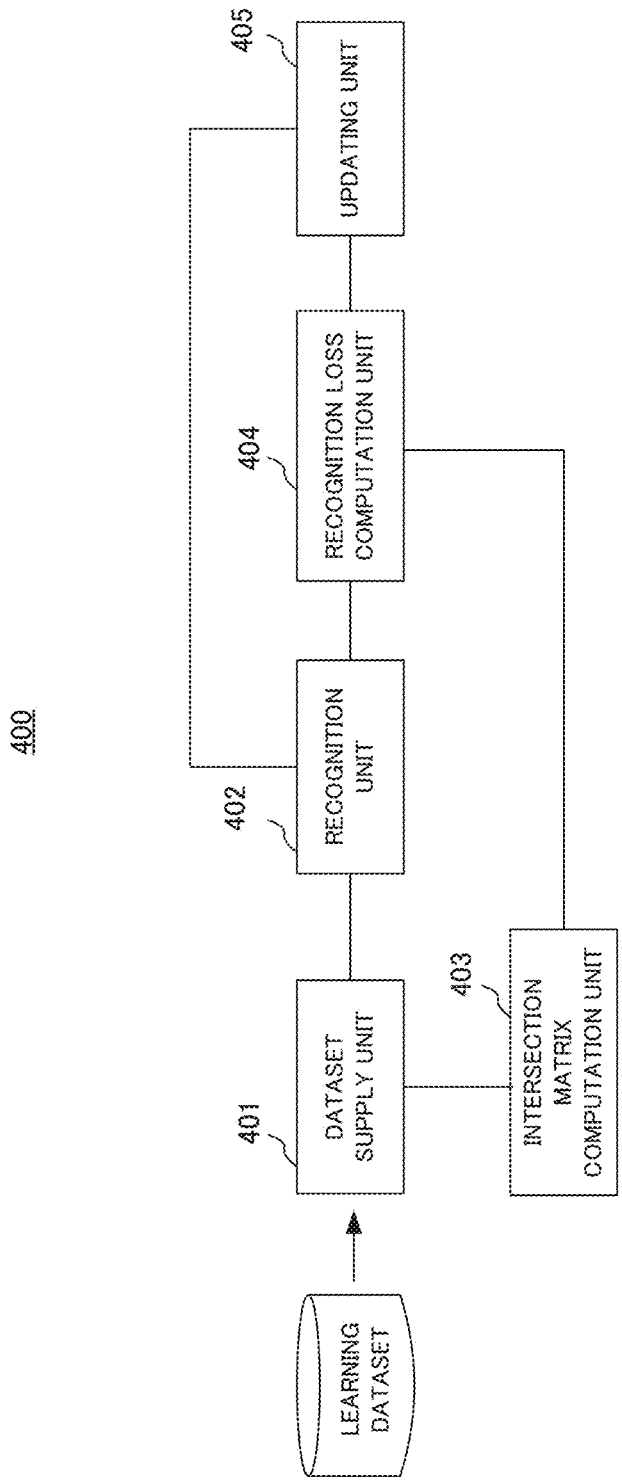

LEARNING DEVICE, LEARNING METHOD AND RECORDING MEDIUM

This application is a National Stage Entry of PCT/JP2019/038343 filed on Sep. 27, 2019, the contents of all of which are incorporated herein by reference, in their entirety.

TECHNICAL FIELD

The present invention relates to a technique for recognizing an object contained in an image.

BACKGROUND ART

Recently, recognition technology using machine learning has become to show extremely high performance mainly in the field of image recognition. The high accuracy of machine learning-based recognition technology is supported by a large amount of learning data including correct answers. However, the cost of collecting data and applying correct answers to the data is high, and especially the cost of applying correct answers in multi-class classification increases as the number of classes increases.

In the multi-class classification, instead of applying correct answers to all the recognition objects, Non-Patent Document 1 proposes a method of using a dataset of partial labels in which correct answers are applied only to a part of the recognition objects.

PRECEDING TECHNICAL REFERENCES

Non-Patent Document

Non-Patent Document 1: Cid-Sueiro, J., Garcia-Garcia, D., and Santos-Rodoriguez, R., "Consistency of losses for learning from weak labels", In ECML-PKDD, 2014.

SUMMARY

Problem to be Solved by the Invention

However, the above document does not present a method for learning a recognition model using learning data composed of multiple partial datasets.

One object of the present invention is to compute a loss using an appropriate intersection matrix and perform learning of a recognition model when learning data composed of a set of a plurality of partial datasets are used.

Means for Solving the Problem

In order to solve the above problem, according to one aspect of the present invention, there is provided a learning device for performing learning using a learning dataset,
wherein the learning dataset includes a plurality of partial datasets to which at least a part of all categories of recognition objects is assigned as a responsible range,
wherein all categories of the recognition objects are assigned to one of the plurality of partial datasets,
wherein each of recognition object data included in the partial dataset is given correct answer data indicating any one of the categories belonging to the responsible range of the partial dataset, or indicating that the category of the recognition object does not belong to the responsible range of the partial dataset, and
wherein the learning device comprises:
a dataset supply unit configured to supply the learning dataset;
a recognition unit configured to output a recognition result for the recognition object data in the supplied learning dataset;
an intersection matrix computation unit configured to compute an intersection matrix based on the learning dataset;
a recognition loss computation unit configured to compute the recognition loss using the recognition result, the intersection matrix, and the correct answer data given to the recognition object data; and
an updating unit configured to update parameters of the recognition unit based on the recognition loss.

According to another aspect of the present invention, there is provided a learning method using a learning dataset,
the learning dataset including a plurality of partial datasets to which at least a part of all categories of recognition objects is assigned as a responsible range,
all categories of the recognition objects being assigned to one of the plurality of partial datasets,
each of recognition object data included in the partial dataset being given correct answer data indicating any one of the categories belonging to the responsible range of the partial dataset, or indicating that the category of the recognition object does not belong to the responsible range of the partial dataset,
the learning method comprises:
supplying the learning dataset;
outputting a recognition result for the recognition object data in the supplied learning dataset;
computing an intersection matrix based on the learning dataset;
computing the recognition loss using the recognition result, the intersection matrix, and the correct answer data given to the recognition object data; and
updating parameters of the recognition unit based on the recognition loss.

According to still another aspect of the present invention, there is provided a recording medium for recording a program for a learning process using a learning dataset,
the learning dataset including a plurality of partial datasets to which at least a part of all categories of recognition objects is assigned as a responsible range,
all categories of the recognition objects being assigned to one of the plurality of partial datasets,
each of recognition object data included in the partial dataset being given correct answer data indicating any one of the categories belonging to the responsible range of the partial dataset, or indicating that the category of the recognition object does not belong to the responsible range of the partial dataset,
the learning process comprises:
supplying the learning dataset;
outputting a recognition result for the recognition object data in the supplied learning dataset;
computing an intersection matrix based on the learning dataset;
computing the recognition loss using the recognition result, the intersection matrix, and the correct answer data given to the recognition object data; and
updating parameters of the recognition unit based on the recognition loss.

Effect of the Invention

According to the present invention, when learning data composed of a set of a plurality of partial datasets are used, it is possible to compute a loss using an appropriate intersection matrix and perform learning of a recognition model.

BRIEF DESCRIPTION OF THE DRAWINGS

FIGS. 2A and 2B show examples of a normal dataset and an expert dataset for an object detection problem.

FIG. 11 is a block diagram showing a functional configuration of a learning device according to a second example embodiment.

EXAMPLE EMBODIMENTS

Hereinafter, with reference to the drawings, preferred example embodiments of the present invention will be described. Incidentally, in the following description, for convenience of notation, a symbol to be attached to the character is denoted before the character. For example, the complement of set A is denoted as "$^-$A" by putting a "$^-$(bar)" before the letter "A".

[Expert Data Set]

First, an expert dataset used in an example embodiment of the present invention will be described.

[1] In Case of a Multi-Class Classification Problem

First, the case of the multi-class classification problem will be described. An "expert dataset" is a learning dataset that can be used to learn a multi-class classification model and composed of a plurality of partial datasets. Specifically, the expert dataset is configured to satisfy the following conditions:

(A) For each of the plurality of partial datasets, at least a part of all categories of recognition objects is assigned as a responsible range.

(B) All categories of the recognition object are assigned to one of the plurality of partial datasets.

(C) Each data included in a partial dataset is given a correct answer label indicating any one of the categories belonging to the responsible range of the partial dataset, or indicating that the category of the recognition object does not belong to the responsible range of the partial dataset.

Figure 1A:
FIGS. 1A and 1B show examples of a normal dataset and an expert dataset for a multi-class classification problem.
Figure 1B:
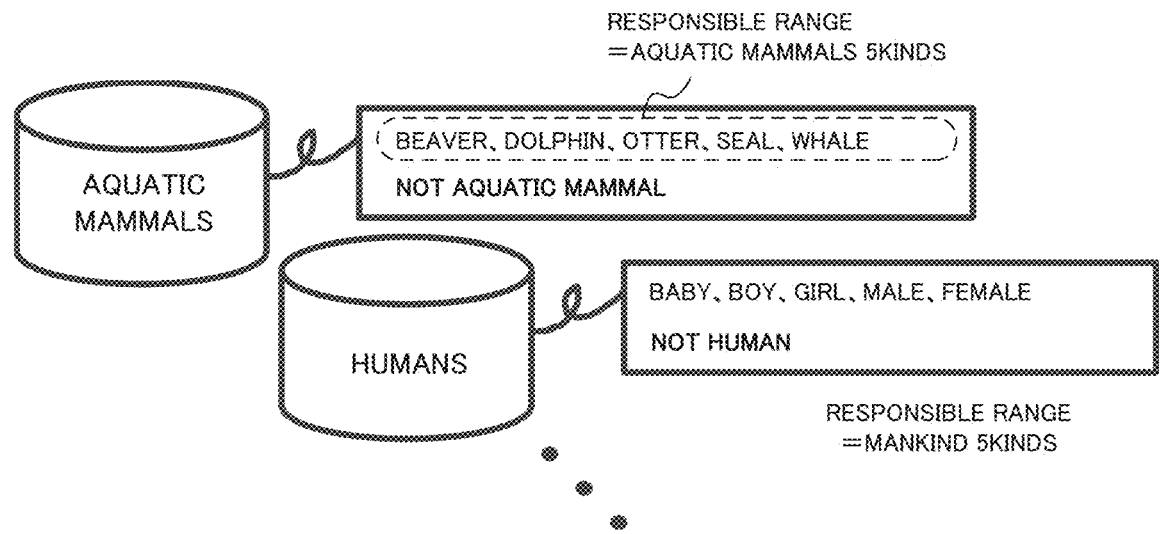

FIGS. 1A and 1B show examples of a normal dataset and an expert dataset for a multi-class classification problem. FIG. 1A shows a normal dataset used for learning. Now, it is assumed that an object recognition model that performs the multi-class classification of 100 classes based on image data is learned. As a normal learning dataset, for each of the prepared image data, one of the 100 classes, i.e., 100 categories, is assigned as a correct answer label (This is called "correct answering"). Therefore, when using a normal dataset, it is necessary to assign one of the 100 categories to each image data included in the multi-class DB. However, this actually requires a considerable amount of labor.

FIG. 1B shows an example of an expert dataset. Incidentally, even in this expert dataset, it is assumed that the multi-class classification of 100 classes is performed on the whole in the same manner as in the example of FIG. 1A. In an expert dataset, a plurality of partial datasets are prepared. In the example of FIG. 1B, a plurality of partial datasets are prepared, such as "Aquatic Mammals", "Humans", and the like. A responsible range is set to each partial dataset. Five types of aquatic mammals, "Beaver," "Dolphin," "Otter," "Seal," and "whale" are assigned as the responsible range for the partial dataset of "Aquatic Mammals." To the partial dataset of "Humans", five kinds of humans, "Baby", "Boy", "Girl", "Male", and "Female" are assigned as the responsible range. Here, the responsible range is determined so that all categories of recognition objects are assigned to any one of the partial datasets. That is, 100 categories are assigned to the plurality of partial datasets such that there is no category that is not assigned to any partial dataset. In other words, the responsible ranges are determined such that all 100 categories of recognition objects are covered by the plurality of partial datasets. Thus, the expert dataset also allows learning of the multi-class classification of 100 classes, similar to the normal dataset shown in FIG. 1A.

However, since the expert dataset uses a plurality of partial datasets, the structure of the correct answer data is different from that of the normal dataset. Specifically, for the image data included in each partial dataset, a correct answer label indicating any one of the categories belonging to its responsible range, or a correct answer label indicating that the category of the image data does not belong to the responsible range of that partial dataset, is prepared. In the example of FIG. 1B, for the image data included in the partial dataset of "Aquatic Mammals", a correct answer label indicating one of "Beaver", "Dolphin", "Otter", "Seal" and "Whale" or a correct answer label indicating that the category of the image data does not belong to the responsible range of that partial dataset is prepared.

Using such an expert dataset greatly reduces the workload of correct answering to learning data. In the case of the normal dataset shown in FIG. 1A, one of the 100 categories should be assigned to all the prepared images as the correct answer labels. For example, when 60000 image data are prepared as the learning data, it is necessary to assign any one of the 100 categories to all of the image data as the correct answer labels. In contrast, in the case of the expert dataset shown in FIG. 1B, the 60000 image data are divided into 20 sets, for example, to prepare 20 partial datasets. In addition, the 100 categories of recognition objects are divided into 20 sets, and five categories are assigned to each partial dataset as the responsible range. Thus, as shown in FIG. 1B, the image data belonging to each partial dataset may be given one of six correct answer labels, i.e., a correct answer label of any one of the five categories belonging to that partial dataset or a correct answer label indicating that the image data does not belong to the responsible range of that partial dataset. Namely, it is sufficient to give one of the six correct answer labels to the 3000 image data included in each partial dataset.

Next, the data structure of the normal dataset and the expert dataset mentioned above will be described. Now we consider a multi-class classification problem which classifies an elements x of a data space X into a correct answer category y, which is an element of a correct answer candidate set Y.
(1) Normal Dataset in a Multi-Class Classification Problem A normal dataset is a set D of pairs (x, y) of the data x, which is an element of the data space X, and the correct answer category y, which is an element of the correct answer candidate set Y:

$$D=\{(x_i,y_i)\}_{i=1}^{N} \quad (1)$$

(2) Expert Dataset in a Multi-Class Classification Problem

Each partial dataset has a correct candidate set Z that the partial dataset is specialized in. The correct candidate set Z is a subset of the correct candidate set Y.

A partial dataset is a set of a group (x, z, Z) of a (unlabeled) data x which is an element of the data space X, a label z, and the correct candidate set Z which represents the partial dataset. Here, z is an element of the correct candidate set Z or a complement set of z=Z (for convenience, referred to as "¯Z"). When z is an element of the correct candidate set Z, the data x belongs to category z. When z=¯Z, the data x belongs to any category that is not included in the correct candidate set Z.

During learning, a plurality of partial datasets are collected so that the elements of the correct candidate set Y are exhausted when the elements of each correct candidate set Z corresponding to each partial dataset are collected.

[2] In Case of an Object Detection Problem

Next, the case of the object detection problem will be described. The expert dataset can also be used for the object detection problem. The object detection problem is a problem to classify whether an object candidate (region proposal/default box) in image data is an object or not and what object it is, if it is an object, and to estimate its coordinates and position. It should be noted that the object detection problem can be considered as a multi-class classification for the default box if it is considered in units of default boxes.

FIG. 2A shows an example of a normal dataset in the case of an object detection problem. In this example, "Bag", "Person" and "Wheelchair" are prepared as the object classes of the detection objects. In addition to these, in the object detection, a "Background" class indicating that no object belonging to the detection target category exists is prepared. It is assumed that "Background" is not a category to be detected. In a normal dataset, a correct answer label is prepared that assigns one of these four classes to the default boxes contained in all image data used as the learning data.

FIG. 2B shows an example of an expert dataset in the case of an object detection problem. Even in the case of the object detection, the basic concept of the expert dataset is similar to that of the aforementioned multi-class classification, and the expert dataset satisfies the aforementioned conditions (A) to (C). In the example of FIG. 2B, a partial dataset DS1 whose responsible range includes "Bag" and "Person" and a partial dataset DS2 whose responsible range includes "Wheelchair" are prepared. In this example, for the partial dataset DS1, "Bag," "Person," "Not bag and person," and "Background" are prepared as the correct answer labels. For the partial dataset DS2, "Wheelchair", "Not wheelchair", and "Background" are prepared as the correct answer labels.

Next, the data structure of the normal dataset and the expert dataset will be described. Now, the object detection problem which outputs the type and bounding box of the object included in the input image is considered. Here, the input image is an element x of a data space X. The number of detection target objects included in one image x is arbitrary. The correct answer data is represented by a pair (y, b) of the category y and the bounding box b (which is an element of a detection target category set Y). The method of representation of the bounding box shall be arbitrary here. Usually, the bounding box is represented by a set of its center coordinates (or the upper left point coordinates) and vertical and horizontal lengths.
(1) Normal Dataset in an Object Detection Problem A set of all of the K detection target objects included in an image x is:

$$\{(y_j,b_j)\}_{j=1}^{K} \quad (2)$$

The pair of the image x and the above set is:

$$(x_i,\{(y_j,b_j)\}_{j=1}^{K}) \quad (3)$$

The normal dataset D, which is a set of the above pair, is as follows:

$$D=\{(x_i,\{(y_j,b_j)\}_{j=1}^{K_i})\}_{i=1}^{N} \quad (4)$$

(2) Expert Dataset in an Object Detection Problem

Each partial dataset has a correct candidate set Z that each partial data set is specialized in. However, the correct candidate set Z is a subset of the correct candidate set Y.

To an image x, out of K detection target objects $$\{(y_j,b_j)\}_{j=1}^{K} \quad (2)$$

only the ones whose category $y_j$ belongs to the correct candidate set Z are given as correct answers.

Each sample is a group of three elements, similar to the multi-class classification problem $$(x_i,\{(z_j,b_j)\}_{j=1}^{K},Z) \quad (6),$$

provided that $z_j \in Z$.

During learning, when a plurality of partial datasets are collected and the elements of the correct candidate set Z corresponding to each partial dataset are collected, the elements of the correct candidate set Y are exhausted.

[3] Generating an Expert Dataset

In the example of FIG. 1B, the 60000 image data prepared as the learning data are evenly divided into 20 datasets. However, the number of image data to be assigned to each dataset need not be equal, and may differ for each dataset. In addition, in the example of FIG. 1B, all categories (100 classes) of the recognition objects are equally divided into 20 partial datasets as the responsible ranges. However, the number of categories assigned to each partial dataset as the responsible range need not be equal. Namely, the number of categories assigned as the responsible range may be different for each partial dataset. Also, all categories, i.e., 100 categories in the above example may be assigned to a certain partial dataset.

Further, in the above description, a predetermined number of recognition objects are first divided into a plurality of partial datasets, and a responsible range is set for each partial dataset to generate the expert dataset. The expert dataset can be generated, not only when the number of categories of the recognition objects is determined from the beginning, but also when the recognition objects are added later. For example, as illustrated in FIG. 2B, it is assumed that at first, learning is performed using an expert dataset including a partial dataset DS1 whose responsible range includes "Bag, Person" and a partial dataset DS2 whose responsible range includes "Wheelchair", and the object detection is performed. In this situation, if "Luggage cart," "Stroller," and the like are newly added to the recognition objects, a new partial dataset whose responsible range includes them may be added. In that case, since it is not necessary to newly give correct answers such as "Luggage cart" and "Stroller" to the image data included in the existing partial datasets DS1 and DS2, the learning data for the new recognition objects can be prepared efficiently.

First Example Embodiment

Next, an example embodiment of a learning device using an expert dataset will be described.

[1] Hardware Configuration

Figure 3:
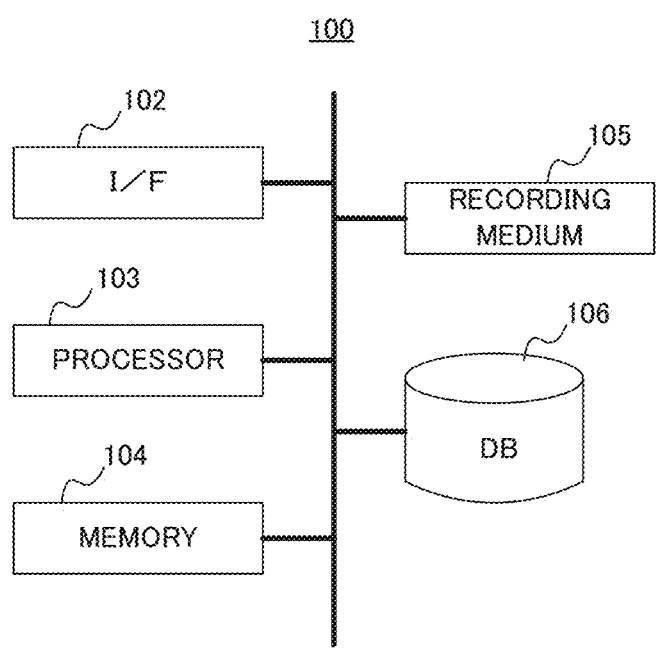
FIG. 3 is a block diagram showing a hardware configuration of a learning device according to a first example embodiment.

FIG. 3 is a block diagram illustrating a hardware configuration of the learning device according to the first example embodiment. As illustrated, the learning device 100 includes an interface 102, a processor 103, a memory 104, a recording medium 105, and a database (DB) 106.

The interface 102 performs data input and output to and from external devices. Specifically, an expert dataset used for learning of the learning device 100 is inputted through the interface 102.

The processor 103 is a CPU (Central Processing Unit) or a computer such as a CPU with a GPU (Graphics Processing Unit), and controls the entire learning device 100 by executing a program prepared in advance. Specifically, the processor 103 executes a learning process to be described later.

The memory 104 is composed of a ROM (Read Only Memory), a RAM (Random Access Memory), or the like. The memory 104 stores models learned by learning device 100. The memory 104 is also used as a work memory during the execution of various processes by the processor 103.

The recording medium 105 is a non-volatile and non-transitory recording medium such as a disk-shaped recording medium, a semiconductor memory, or the like, and is configured to be detachable from the learning device 100. The recording medium 105 records various programs executed by the processor 103. When the learning device 100 performs various kinds of processes, a program recorded on the recording medium 105 is loaded into the memory 104 and executed by the processor 103.

The database 106 stores an expert dataset used for learning. In addition to the above, the learning device 100 may include an input device or a display unit such as a keyboard or a mouse for the user to perform instructions or inputs.

(Functional Configuration of a First Learning Device)

Figure 4:
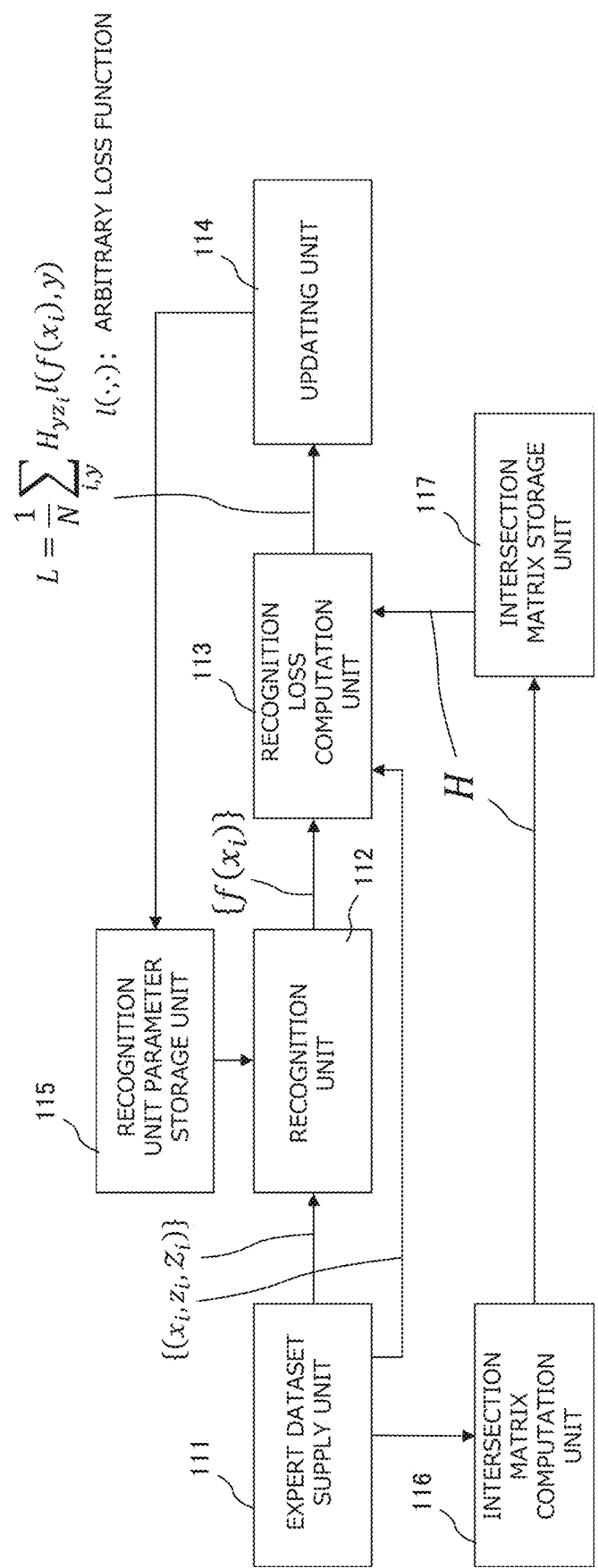
FIG. 4 is a block diagram showing a functional configuration of a first learning device.

FIG. 4 is a block diagram showing a functional configuration of the first learning device according to the first example embodiment. Incidentally, this learning device 100 learns a multi-class classification model. The learning device 100 includes an expert dataset supply unit 111, a recognition unit 112, a recognition loss computation unit 113, an updating unit 114, a recognition unit parameter storage unit 115, an intersection matrix computation unit 116, and an intersection matrix storage unit 117.

The expert dataset supply unit 111 supplies the input data of the aforementioned expert dataset to the recognition unit 112 and the recognition loss computation unit 113. Specifically, the expert dataset supply unit 111 supplies a group $\{x_i, z_i, Z_i\}$ (hereinafter, referred to as "group of input data") of the input $x_i$, the label $z_i$, and the correct answer candidate set $Z_i$ to the recognition unit 112 and the recognition loss computation unit 113. The recognition unit 112 includes a recognition model composed of a neural network or the like, and performs recognition process of the input x which is image data and outputs the recognition result $\{f(x_i)\}$ to the recognition loss computation unit 113.

On the other hand, the intersection matrix computation unit 116 computes the intersection matrix H based on the attribute values of the expert dataset, and supplies the intersection matrix H to the intersection matrix storage unit 117. Incidentally, the intersection matrix will be described in detail later. The intersection matrix storage unit 117 stores the supplied intersection matrix H, and supplies it to the recognition loss computation unit 113.

The recognition loss computation unit 113 computes the recognition loss L using the group $\{x_i, z_i, Z_i\}$ of input data supplied from the expert dataset supply unit 111, the recognition result $\{f(x_i)\}$ supplied from the recognition unit 112, and the intersection matrix H, and supplies the recognition loss L to the updating unit 114. The recognition loss L will be described in detail later. The updating unit 114 updates the parameters constituting the recognition model of the recognition unit 112 based on the recognition loss L, and supplies the updated parameters to the recognition unit parameter storage unit 115. The recognition unit parameter storage unit 115 stores the updated parameters supplied from the updating unit 114. The parameters stored in the recognition unit parameter storage unit 115 are read out at the timing of updating the parameters of the recognition unit 112 and are set to the recognition unit 112. In this way, the learning of the recognition unit 112 is performed using the expert dataset as the learning data.

(Intersection Matrix)

Next, the intersection matrix will be described in detail. When learning is performed using a normal dataset, one correct answer label is prepared for the input image data for learning. Therefore, the loss L between the recognition result by the recognition unit and the correct answer label is computed, and the parameters of the recognition unit are updated so that the loss L becomes small. However, as described above, the expert dataset includes multiple partial datasets, each of which is assigned a part of all categories of recognition objects as the responsible range. For the categories belonging to the responsible range, each partial dataset has a correct answer label indicating one of the categories belonging to the responsible range. However, for the categories not belonging to the responsible range, each partial dataset only has a correct answer label indicating that the category does not belong to the responsible range (a correct answer label of the type of "not XX"). Therefore, unlike the case of a normal dataset, the loss L cannot be computed by simply comparing the recognition result by the recognition unit with the correct answer label. In this view, the present example embodiment enables to compute the loss L for the recognition result of the expert dataset by introducing the intersection matrix H.

In supervised learning using a normal dataset, a loss function is defined for the set $\{(x_i, y_i)\}$ of the pair $(x_i, y_i)$ of the input data x and the correct answer label $y_i$ as follows.

$$L = \frac{1}{N}\sum_i l(f(x_i), y_i) \tag{7}$$

$l(\cdot, \cdot)$: Arbitrary loss function

On the other hand, in the partial dataset in the expert dataset, instead of the correct answer label $y_i$, a correct answer candidate set $Z_i$ including candidates of the correct answer label $y_i$ is given. Therefore, an intersection matrix H which associates the correct answer candidate set $Z_i$ included in the partial dataset with the correct answer category y is introduced. The intersection matrix H is a rectangular matrix having the correct answer category y in the row subscript and the correct answer category y or the correct answer label $\bar{Z}_i$ of the type "not XX" in the column subscript. By using the intersection matrix H, the loss function for the group $\{x_i, z_i, Z_i\}$ of input data can be computed as follows.

$$L = \frac{1}{N}\sum_{i,y} H_{y\in Z_i} l(f(x_i), y) \qquad (8)$$

$l(\cdot, \cdot)$: Arbitrary loss function

As Equation (8) shows, the recognition loss L for the expert dataset is obtained by computing the loss between the recognition result of each input data $x_i$ and all the correct categories y using an arbitrary loss function, and weighting and adding them using the weights indicated by the intersection matrix H. Therefore, by appropriately generating the intersection matrix H, it is possible to compute the recognition loss L even when the expert dataset is used. As a result, even when the expert dataset is used, it becomes possible to learn the recognition unit so as to obtain the recognition accuracy close to the case when a normal dataset is used.

Next, the computation method of the intersection matrix will be described.

(1) Multi-Class Classification Problem

First, the case of a multi-class classification problem will be described. In order to compute the intersection matrix H, the matrix M (also referred to as the "transition matrix") is defined as follows.

$$M_{zy} = \Sigma_{d=1}^{N_D} \pi_d p(z|y,d) w_d(y) \qquad (9)$$

Here, the elements in Equation (9) are the following attribute values for an expert dataset.

"d": Subscript representing the partial dataset, "$N_D$": Number of partial datasets if c=|Y| (|Y| is the number of elements in set Y), the matrix M is a matrix of (c+$N_D$) rows and c columns "$\pi_d$": Expert prior distribution, indicating the rate that an arbitrary selected data x belongs to each partial dataset "p(z|y,d)": Probability of labeling z for the correct answer category y∈Y in the partial dataset d When y∈$Z_d$, "1" if z=y, "0" otherwise When not y∈$Z_d$, "1" if z=$^-Z_d$ and "0" otherwise "$w_d(y)$=p(y|d)/q(y)": Category weight "p(y|d)": Category prior distribution, indicating the rate of the correct answer category y included in the partial dataset d "q(y)": Category prior distribution as a reference, arbitrary parameter It is noted that the expert prior distribution is an example of the first prior distribution, the category prior distribution is an example of the second prior distribution, and "p(z|y,d)" is an example of a code indicating the responsible range assigned to each of the partial datasets.

Once the above matrix M is obtained, the intersection matrix H is obtained as follows.

$$H = (I + \vec{1}\vec{v}^T)\tilde{M}^+ \qquad (10)$$

Here,

"I" is a c-dimensional unit matrix

"$\vec{1}$" is a c-dimensional vertical vector in which all elements are "1"

"$\vec{v}$" is an arbitrary vertical vector of c dimension

"$^-M^+$" is an arbitrary left inverse matrix of the matrix M (i.e., the matrix satisfying $^-M^+M=I$)

Incidentally, although the left inverse matrix is generally not only one and there are infinite number, any one may be used.

(2) Object Detection Problem (when there is a "Background")

Next, the case of the object detection problem will be described. Again, the matrix M is basically determined by Equation (9) like the case of the above multi-class classification problem. However, in the case of the object detection problem, there is a class of "background" as described above. Therefore, the following two points are different from the case of the multi-class classification problem.

If c=|Y| (|Y| is the number of elements in set Y), the matrix M is a matrix of (c+$N_D$) rows and (c+1) columns "p(z|y,d)": Probability of labeling z for the correct answer category y∈Y in the partial dataset d When y∈$Z_d$, "1" if z=y, "0" otherwise When not y∈$Z_d$, (including y=$^-$Y, wherein "$^-$Y" indicates background) "1" if z=$^-Z_d$ and "0" otherwise Further, the intersection matrix H is obtained by Equation (10) like the case of the multi-class classification problem. However, since there is a class of "background", the following three points are different.

"I" is a (c+1) dimensional unit matrix

"$\vec{1}$" is a vertical vector of (c+1) dimensions, and all elements are "1"

"$\vec{v}$" is an arbitrary vertical vector of (c+1) dimensions

As described above, in both cases of the multi-class classification problem and the object detection problem, if the matrix M is obtained by Equation (9) and the intersection matrix H is obtained by Equation (10), it is possible to compute the recognition loss L by Equation (8).

(Learning Process by the First Learning Device)

Figure 5:
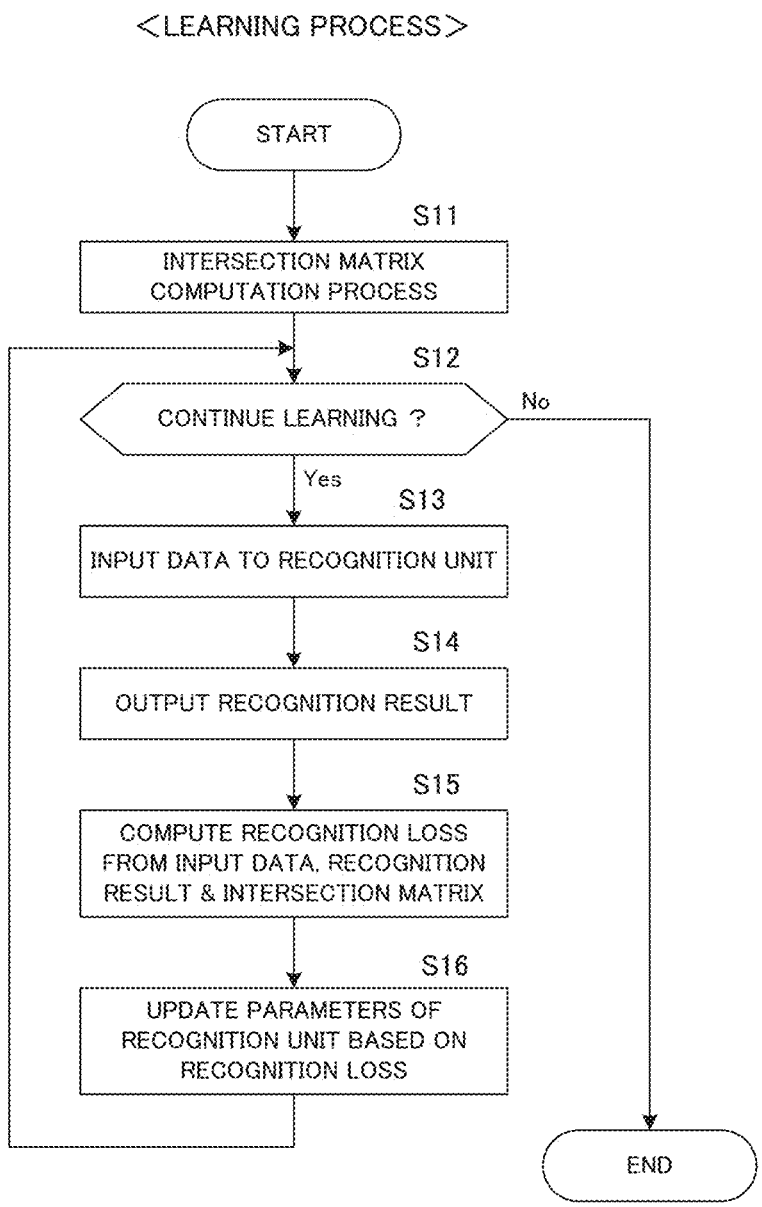
FIG. 5 is a flowchart of a learning process by the first learning device.

FIG. 5 is a flowchart of learning process by the first learning device. This process is realized by the processor 103 shown in FIG. 3 executing a program prepared in advance and operating as each element shown in FIG. 4. First, the intersection matrix computation unit 116 computes the intersection matrix H using the attribute values of the expert dataset by the method described above (step S11). The computed intersection matrix H is stored in the intersection matrix storage unit 117.

Next, it is determined whether or not to continue the learning (step S12). This determination is made on the basis of whether a predetermined ending condition has been met. The ending condition may include, for example, whether or not all the prepared learning data have been used, or whether or not the number of times the parameter has been updated has reached the predetermined number of times.

When it is determined that the learning is continued (step S12: Yes), the expert dataset supply unit 111 inputs a set of input data to the recognition unit 112 (step S13). The recognition unit 112 performs recognition process based on the input data, and outputs the recognition result to the recognition loss computation unit 113 (step S14).

Next, the recognition loss computation unit 113 computes the recognition loss L by the aforementioned equation (8) using the input data, the recognition result, and the intersection matrix (step S15). Then, the updating unit 114 updates the parameters of the recognition unit 112 so that the computed recognition loss L is reduced (step S16). Namely, the updated parameters are stored in the recognition unit parameter storage unit 115 and set to the recognition unit 112. Thus, steps S12 to S16 are repeated, and when it is determined that the learning is not continued in step S12, the process ends.

(Functional Configuration of the Second Learning Device)

Next, the functional configuration of the second learning device will be described. The first learning device assumes that the attribute values of the expert dataset required to compute the intersection matrix are given in advance. On the other hand, in the second learning device, those attribute values are not given, and it is necessary to generate them on the learning device side. Specifically, the second learning device estimates the expert prior distribution ltd and the category prior distribution p(y|d) from the expert dataset, and computes the intersection matrix using the estimated values.

Figure 6:
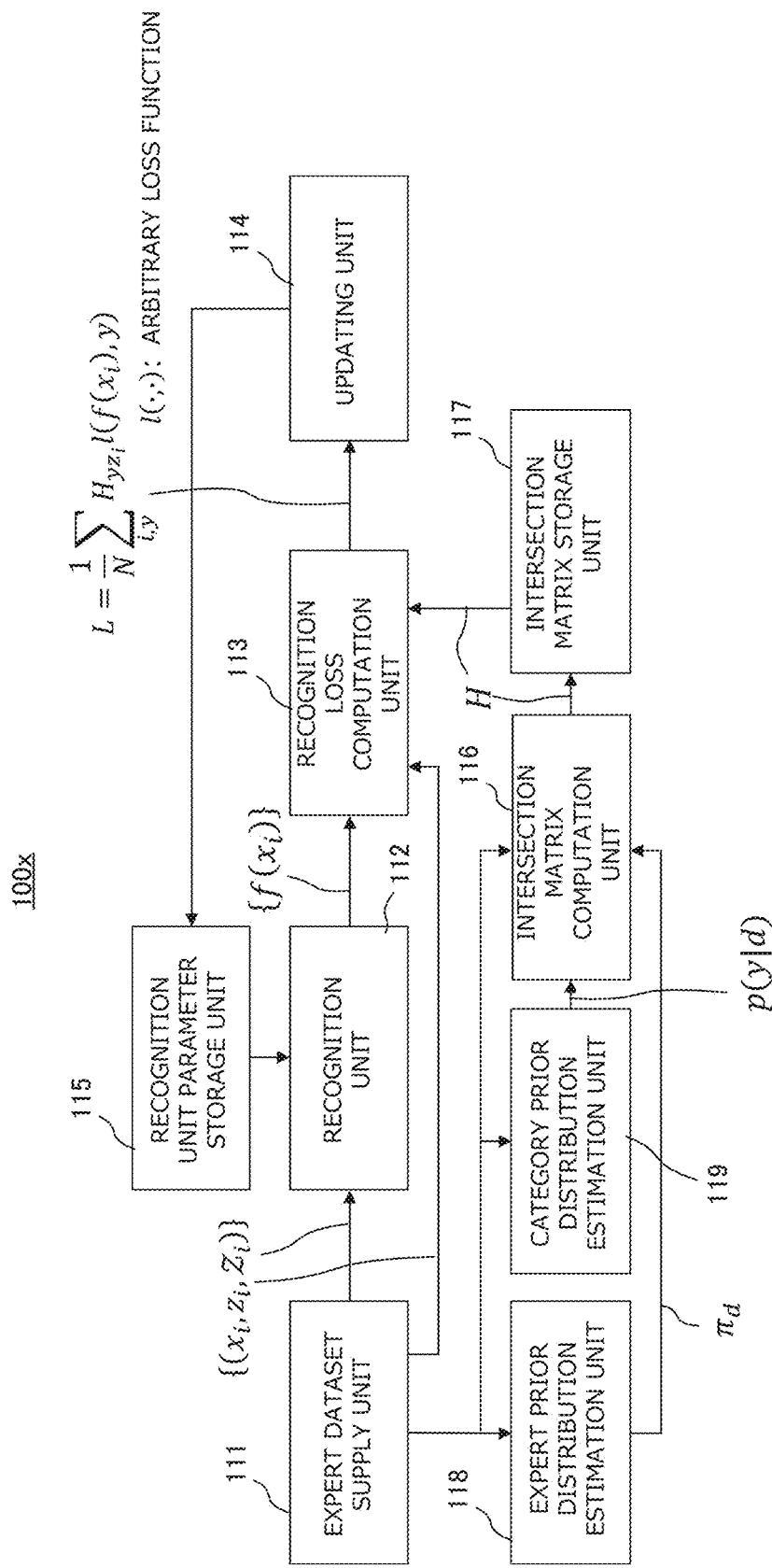
FIG. 6 is a block diagram showing a functional configuration of a second learning device.

FIG. 6 is a block diagram showing a functional configuration of the second learning device 100x. As understood from comparison with the first learning device 100 shown in FIG. 4, the second learning device 100x includes an expert prior distribution estimation unit 118 and a category prior distribution estimation unit 119. In other points, the second learning device 100x is the same as the first learning device 100. Incidentally, the expert prior distribution estimation unit 118 is an example of the first estimation unit, and the category prior distribution estimation unit 119 is an example of the second estimation unit.

The expert dataset supply unit 111 supplies the expert dataset to the expert prior distribution estimation unit 118, the category prior distribution estimation unit 119, and the intersection matrix computation unit 116. The expert prior distribution estimation unit 118 estimates the expert prior distribution $\pi_d$. Specifically, the expert prior distribution estimation unit 118 counts the number of samples $N_d$ included in each partial dataset in the expert dataset and determines the expert prior distribution $\pi_d$ by the following equation.

$$\pi_d = \frac{N_d}{\sum_{d'} N_{d'}} \tag{11}$$

The expert prior distribution $\pi_d$ is the rate that an input data belongs to the partial dataset d when the input data is selected from the entire expert dataset. Therefore, as Equation (11) shows, the expert prior distribution $\pi_d$ may be computed as the value obtained by dividing the number of samples of a certain partial dataset d by the sum of the number of samples included in all the partial datasets. The expert prior distribution estimation unit 118 supplies the computed expert prior distribution $\pi_d$ to the intersection matrix computation unit 116.

Figure 7:
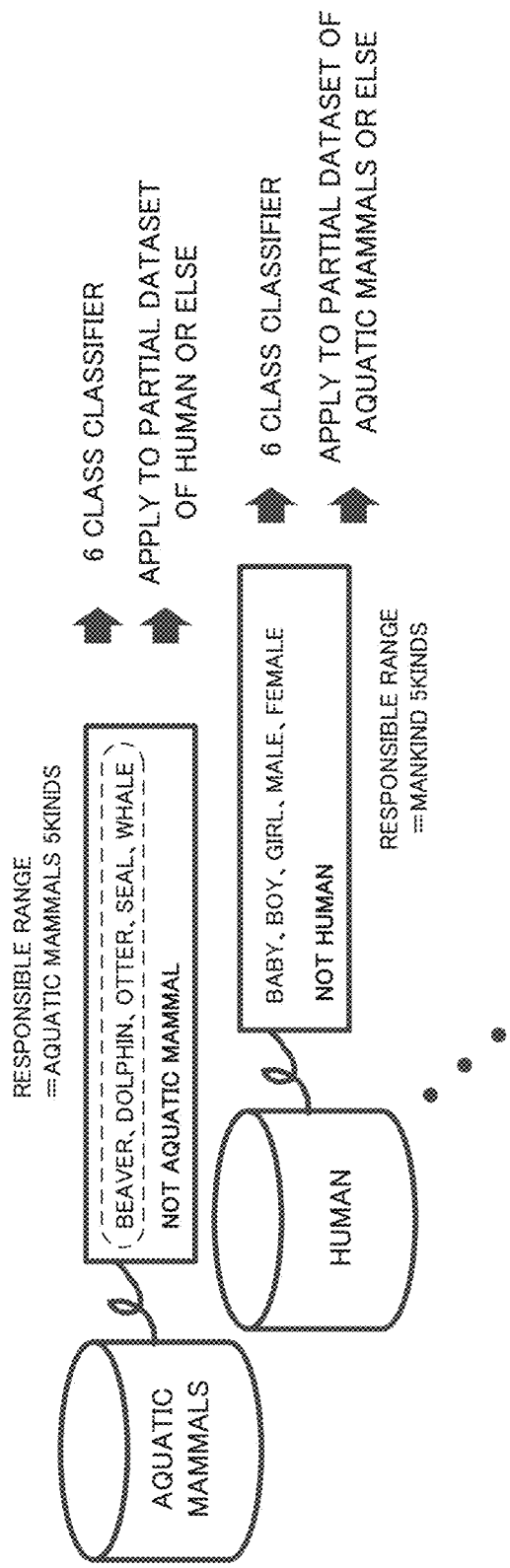
FIG. 7 is a diagram illustrating an estimation method of a category prior distribution.

The category prior distribution estimation unit 119 estimates the category prior distribution p(y|d) from the expert dataset. FIG. 7 is a diagram illustrating a method of estimating the category prior distribution. Incidentally, FIG. 7 assumes an example of the expert dataset shown in FIG. 1B. First, the category prior distribution estimation unit 119 performs supervised learning using each partial dataset. In the example of FIG. 7, a partial dataset of aquatic mammals is used to learn a classifier of six classes, including five aquatic mammals belonging to its responsible range and a class of "not aquatic mammals." This enables to classify the input data in the partial dataset of aquatic mammals into five types of aquatic mammals and others. Similarly, classifiers of six classes are learned using the partial datasets of humans and others.

Next, the data classified as "not XX" by a certain classifier is applied to the classifier learned by another partial dataset to classify. For example, when the data classified as "not aquatic mammals" by the classifier learned with the partial dataset of aquatic mammals is classified by the classifier learned with the partial dataset of humans, five categories of humans can be newly found from them. Also, when the data classified as "not aquatic mammals" by the classifier learned with the partial dataset of aquatic mammals are further classified by the classifier learned with another partial dataset, it is possible to newly find 5 categories included in the responsible range of that partial dataset. Thus, by applying the data classified as "not aquatic mammals" to the classifiers learned with all other partial datasets, all data included in the partial dataset of aquatic mammals can be classified into one of the total 100 classes. Thus, it is possible to estimate the proportion of all 100 classes contained in the partial dataset of aquatic mammals. If this process is performed for all partial datasets, the category prior distribution can be estimated. The estimated category prior distribution p(y|d) is supplied to the intersection matrix computation unit 116.

Thus, when the expert prior distribution $\pi_d$ and the category prior distribution p(y|d) are obtained, the intersection matrix computation unit 116 can compute the transition matrix M from them using Equation (9) and further compute the intersection matrix H using Equation (10).

(Learning Process by the Second Learning Device)

The learning process by the second learning device 100x is basically the same as the learning process by the first learning device 100 shown in FIG. 5. However, the second learning device 100x differs from the first learning device 100 in that the expert prior distribution and the category prior distribution are estimated in the intersection matrix computation process in step S11.

Figure 8:
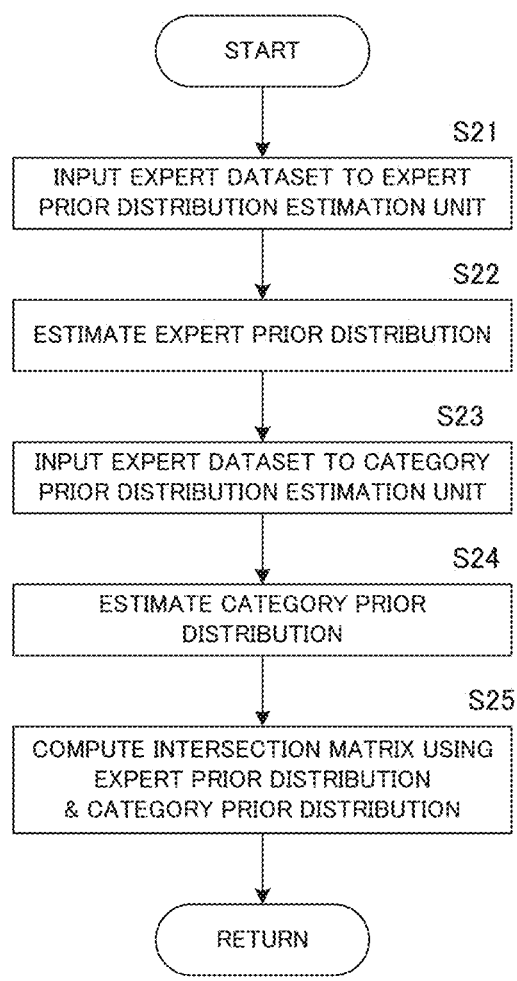
FIG. 8 is a flowchart of an intersection matrix computation process by the second learning device.

FIG. 8 is a flowchart of the intersection matrix computation process performed by the second learning device 100x in step S11. First, the expert dataset supply unit 111 inputs the expert dataset to the expert prior distribution estimation unit 118 (step S21), and the expert prior distribution estimation unit 118 estimates the expert prior distribution using the inputted expert dataset (step S22). Next, the expert dataset supply unit 111 inputs the expert dataset to the category prior distribution estimation unit 119 (step S23), and the category prior distribution estimation unit 119 estimates the category prior distribution using the inputted expert dataset (step S24). Then, the intersection matrix computation unit 116 computes the intersection matrix using the estimated expert prior distribution and the estimated category prior distribution (step S25). Since the subsequent process is the same as in the case of the first learning device 100 shown in FIG. 5, description thereof will be omitted.

EXAMPLES

Next, Examples of the Above-Described Learning Device Will be Described.

(1) Example of Multi-Class Classification

Figure 9:
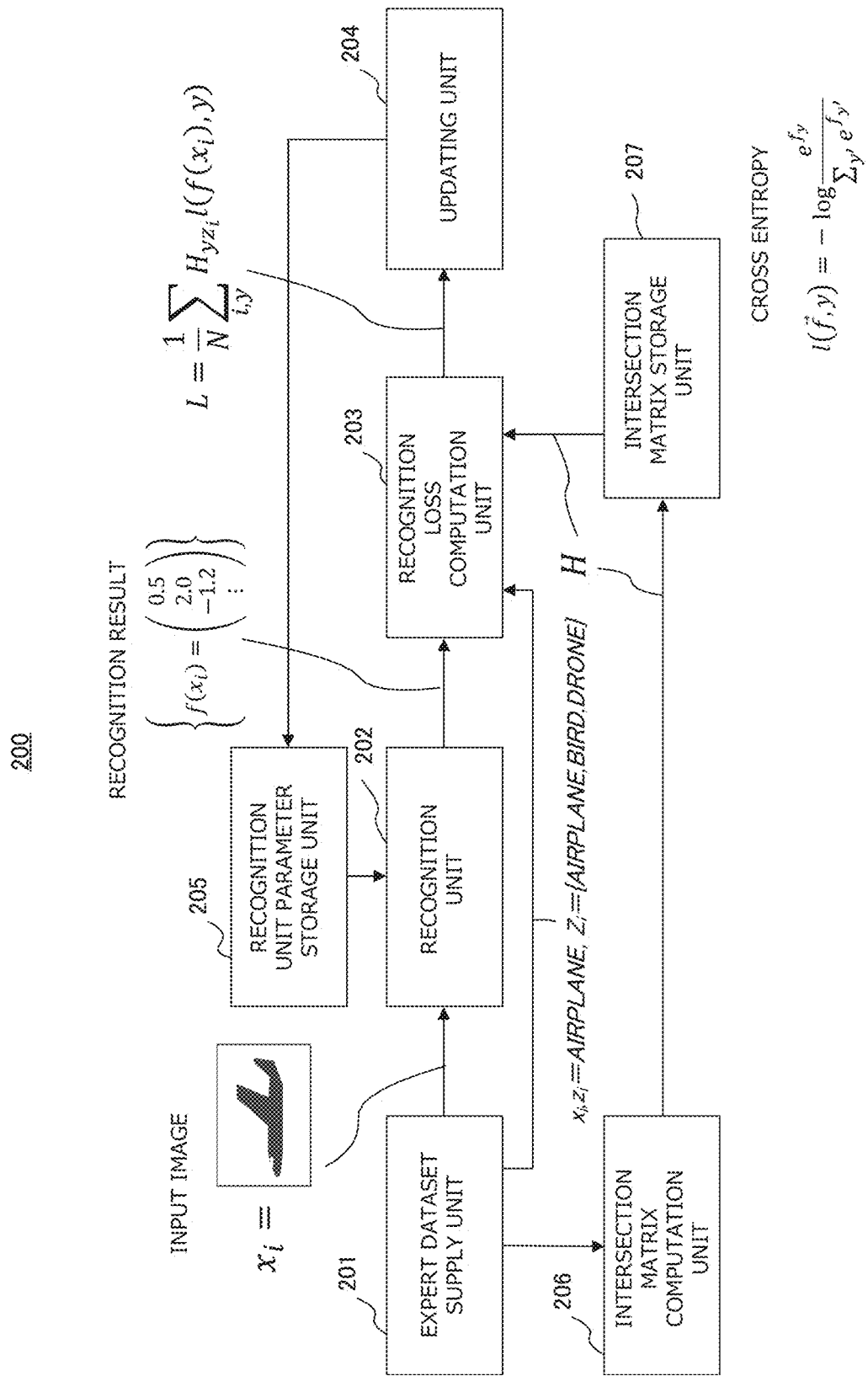
FIG. 9 is a block diagram showing a functional configuration of a learning device according to an example of a multi-class classification.

FIG. 9 shows the functional configuration of the learning device 200 according to the example of the multi-class classification. The learning device 200 is basically configured in the same manner as the first learning device 100 shown in FIG. 4 and includes an expert dataset supply unit 201, a recognition unit 202, a recognition loss computation unit 203, an updating unit 204, a recognition unit parameter storage unit 205, an intersection matrix computation unit 206, and an intersection matrix storage unit 207. In this example, the expert dataset includes a partial dataset of flying objects whose responsible range includes categories {airplanes, birds, drones}.

The expert dataset supply unit 201 supplies a group of input data to the recognition unit 202, the recognition loss computation unit 203, and the intersection matrix computation unit 206. The recognition unit 202 outputs the recognition result of the input image $x_i$ to the recognition loss computation unit 203. The intersection matrix computation unit 206 computes the intersection matrix H based on the attribute values of the expert dataset and stores it in the intersection matrix storage unit 207. The recognition loss computation unit 203 computes the recognition loss L using the group of input data, the recognition result, and the intersection matrix, and supplies the recognition loss L to the updating unit 204. In this example, the cross entropy is used as the loss function in the computation of the recognition loss L. The updating unit 204 updates the parameters based on the recognition loss L and stores them in the recognition unit parameter storage unit 205. The updated parameters stored are set to the recognition unit 202. Thus, the learning of the recognition unit 202 is performed.

When the expert dataset does not include the attribute values, the expert prior distribution and the category prior distribution may be estimated from the expert dataset and the intersection matrix H may be computed as in the aforementioned second learning device. Further, at the time of inference after completion of learning, the image data is inputted to the recognition unit 202 which is updated to the latest parameters, and the recognition unit 202 outputs the recognition result for the inputted image data.

(2) Example of Object Detection

Figure 10:
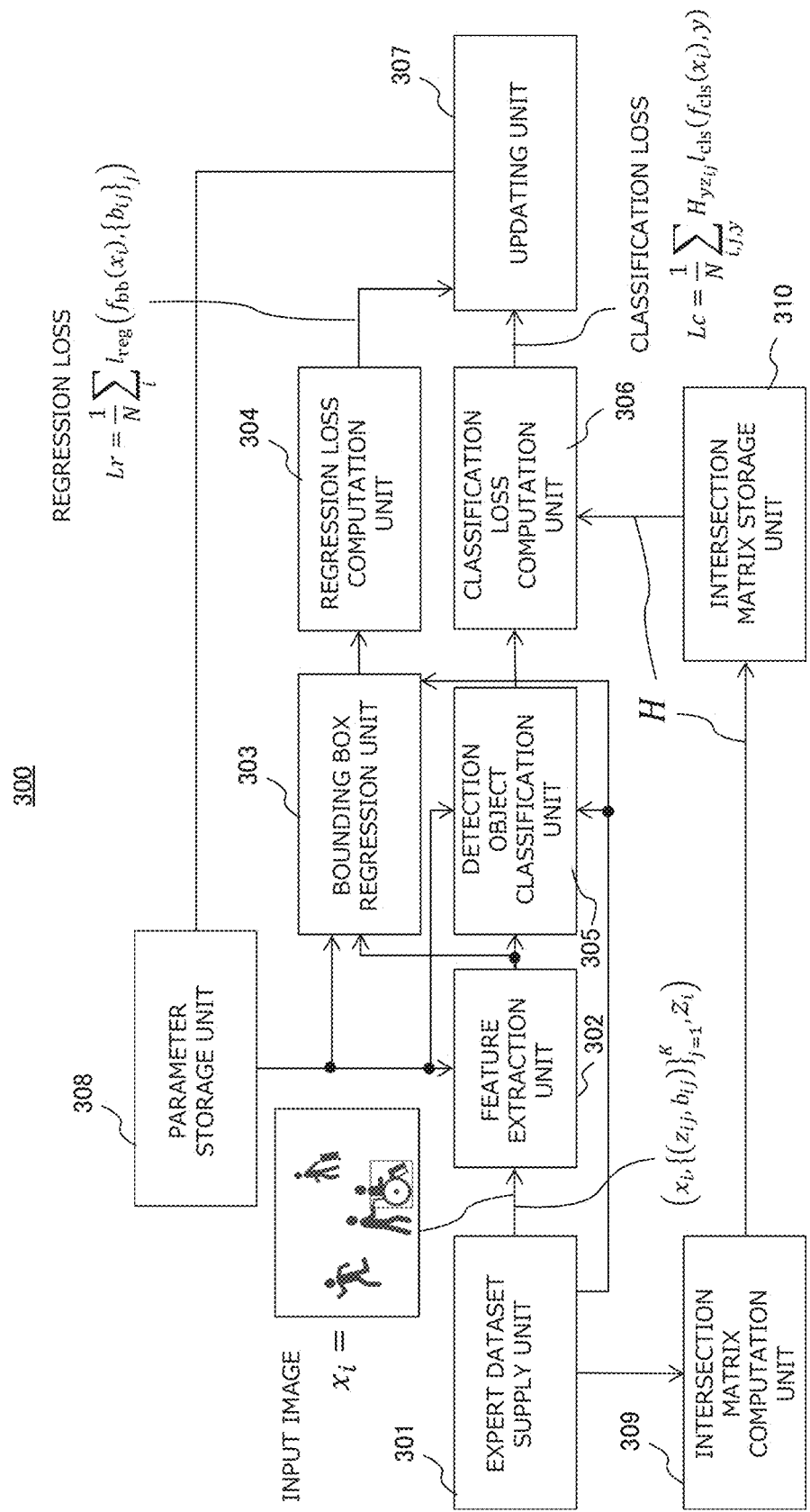
FIG. 10 is a block diagram showing a functional configuration of a learning device according to an example of an object detection.

FIG. 10 is a block diagram illustrating a functional configuration of a learning device 300 according to an example of object detection. The learning device 300 includes an expert dataset supply unit 301, a feature extraction unit 302, a bounding box regression unit 303, a regression loss computation unit 304, a detection object classification unit 305, a classification loss computation unit 306, an updating unit 307, a parameter storage unit 308, an intersection matrix computation unit 309, and an intersection matrix storage unit 310.

The expert dataset supply unit 301 supplies a group of input data to the feature extraction unit 302, the bounding box regression unit 303, and the detection object classification unit 305, and supplies the expert dataset to the intersection matrix computation unit 309. The feature extraction unit 302 extracts the feature vector from the input image $x_i$, and supplies the object candidate and the feature vector for each default box to the bounding box regression unit 303 and the detection object classification unit 305. The number of dimensions of the feature vector is arbitrary.

The bounding box regression unit 303 computes the position of the default box and the position of the bounding box corresponding to the object candidate, and supplies them to the regression loss computation unit 304. The regression loss computation unit 304 computes the regression loss Lr indicating the positional deviation between the default box and the bounding box, and supplies it to the updating unit 307. The detection object classification unit 305 classifies the object included in the object candidate and supplies the classification result to the classification loss computation unit 306.

The intersection matrix computation unit 309 computes the intersection matrix H by the aforementioned method based on the attribute values of the expert dataset, and stores it in the intersection matrix storage unit 310. The classification loss computation unit 306 computes the classification loss Lc using the classification result by the detection object classification unit 305 and the intersection matrix H, and supplies the classification loss Lc to the updating unit 307.

The updating unit 307 updates the parameters of the network constituting the feature extraction unit 302, the bounding box regression unit 303, and the detection object classification unit 305 based on the regression loss Lr and the classification loss Lc, and stores them in the parameter storage unit 308. The updated parameters thus stored are set to the feature extraction unit 302, the bounding box regression unit 303, and the detection object classification unit 305.

When the expert dataset does not include the attribute values, the expert prior distribution and the category prior distribution may be estimated from the expert dataset to compute the intersection matrix H, as in the aforementioned second learning device. At the time of inference after completion of learning, the updated parameters are set to the updated feature extraction unit 302, the bounding box regression unit 303, and the detected object classification unit 305, and the image data is inputted to the feature extraction unit 302. The input image data is processed by the feature extraction unit 302, the bounding box regression unit 303, and the detection object classification unit 305. Then, the non-maximum value suppression process (NMS: Non-Maximum Suppression) is performed using the position of the object outputted by the bounding box regression unit 303 and the classification result of the object outputted by the detection object classification unit 305 (the score for each detection object). Finally, the type and the position are outputted for each detection object.

Second Example Embodiment

Next, a second example embodiment of the present invention will be described. FIG. 11 is a block diagram illustrating a functional configuration of the learning device 400 according to the second example embodiment. The hardware configuration of the learning device 400 is the same as that shown in FIG. 3. As illustrated, the learning device 400 includes a dataset supply unit 401, a recognition unit 402, an intersection matrix computation unit 403, a recognition loss computation unit 404, and an updating unit 405.

The learning device 400 performs learning using a learning dataset. Here, the learning dataset includes a plurality of partial datasets in which at least a part of all categories of the recognition objects is assigned as a responsible range, and all categories of the recognition objects are assigned to any one of the plurality of partial datasets. In addition, each of the recognition object data included in the partial dataset is given correct answer data indicating any one of the categories belonging to the responsible range of the partial dataset, or indicating that the category of the recognition object does not belong to the responsible range of the partial dataset.

The dataset supply unit 401 supplies the above-described learning dataset. The recognition unit 402 outputs the recognition result for the recognition object data in the supplied learning dataset. Further, the intersection matrix computation unit 403 computes the intersection matrix based on the learning dataset. The recognition loss computation unit 404 computes the recognition loss using the recognition result, the intersection matrix, and the correct answer data given to the recognition object data. Then, the updating unit 405 updates the parameters of the recognition unit based on the recognition loss.

A part or all of the example embodiments described above may also be described as the following supplementary notes, but not limited thereto.

(Supplementary Note 1)

A learning device for performing learning using a learning dataset,
wherein the learning dataset includes a plurality of partial datasets to which at least a part of all categories of recognition objects is assigned as a responsible range,
wherein all categories of the recognition objects are assigned to one of the plurality of partial datasets,
wherein each of recognition object data included in the partial dataset is given correct answer data indicating any one of the categories belonging to the responsible range of the partial dataset, or indicating that the category of the recognition object does not belong to the responsible range of the partial dataset, and
wherein the learning device comprises:
a dataset supply unit configured to supply the learning dataset;
a recognition unit configured to output a recognition result for the recognition object data in the supplied learning dataset;
an intersection matrix computation unit configured to compute an intersection matrix based on the learning dataset;
a recognition loss computation unit configured to compute the recognition loss using the recognition result, the intersection matrix, and the correct answer data given to the recognition object data; and
an updating unit configured to update parameters of the recognition unit based on the recognition loss.

(Supplementary Note 2)

The learning device according to Supplementary note 1, wherein the intersection matrix computation unit computes the intersection matrix based on a first prior distribution that is a rate that the recognition object data in the learning dataset belongs to each partial dataset, a second prior distribution that is a rate of each category included in the partial dataset, and a code indicating the responsible range assigned to each of the partial datasets.

(Supplementary Note 3)

The learning device according to Supplementary note 2, further comprising:
a first estimation unit configured to estimate the first prior distribution from the learning dataset; and
a second estimation unit configured to estimate the second prior distribution from the learning dataset.

(Supplementary Note 4)

The learning device according to Supplementary note 2 or 3, wherein the intersection matrix computation unit computes a transition matrix using the first prior distribution, the second prior distribution, and the code indicating the responsible range, and computes the intersection matrix using an inverse matrix of the transition matrix.

(Supplementary Note 5)

The learning device according to any one of Supplementary notes 1 to 4, wherein the recognition loss computation unit computes the recognition loss by weighting and adding losses between the recognition result for all the recognition object data included in the learning dataset and all the categories of the recognition objects using elements of the intersection matrix as weights.

(Supplementary Note 6)

A learning method using a learning dataset,
the learning dataset including a plurality of partial datasets to which at least a part of all categories of recognition objects is assigned as a responsible range,
all categories of the recognition objects being assigned to one of the plurality of partial datasets,
each of recognition object data included in the partial dataset being given correct answer data indicating any one of the categories belonging to the responsible range of the partial dataset, or indicating that the category of the recognition object does not belong to the responsible range of the partial dataset,
the learning method comprises:
supplying the learning dataset;
outputting a recognition result for the recognition object data in the supplied learning dataset;
computing an intersection matrix based on the learning dataset;
computing the recognition loss using the recognition result, the intersection matrix, and the correct answer data given to the recognition object data; and
updating parameters of the recognition unit based on the recognition loss.

(Supplementary Note 7)

A recording medium for recording a program for a learning process using a learning dataset,
the learning dataset including a plurality of partial datasets to which at least a part of all categories of recognition objects is assigned as a responsible range,
all categories of the recognition objects being assigned to one of the plurality of partial datasets,
each of recognition object data included in the partial dataset being given correct answer data indicating any one of the categories belonging to the responsible range of the partial dataset, or indicating that the category of the recognition object does not belong to the responsible range of the partial dataset,
the learning process comprises:
supplying the learning dataset;
outputting a recognition result for the recognition object data in the supplied learning dataset;
computing an intersection matrix based on the learning dataset;
computing the recognition loss using the recognition result, the intersection matrix, and the correct answer data given to the recognition object data; and
updating parameters of the recognition unit based on the recognition loss.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS 100, 200, 300, 400 Learning device
111 Expert dataset supply unit
112 Recognition unit
113 Recognition loss computation unit
114 Updating unit
115 Recognition unit parameter storage unit 116 Intersection matrix computation unit
117 Intersection matrix storage unit
118 Expert prior distribution estimation unit
119 Category prior distribution estimation unit

What is claimed is:

1. A learning device for performing learning using a learning dataset,
   wherein the learning dataset includes a plurality of partial datasets to which at least a part of all categories of recognition objects is assigned as a responsible range,
   wherein all categories of the recognition objects are assigned to one of the plurality of partial datasets,
   wherein each of recognition object data included in the partial dataset is given correct answer data indicating any one of the categories belonging to the responsible range of the partial dataset, or indicating that the category of the recognition object does not belong to the responsible range of the partial dataset, and
   wherein the learning device comprises:
   a memory configured to store instructions; and
   one or more processors configured to execute the instructions to:
   supply the learning dataset;
   output a recognition result for the recognition object data in the supplied learning dataset;
   compute an intersection matrix based on the learning dataset;
   compute the recognition loss using the recognition result, the intersection matrix, and the correct answer data given to the recognition object data; and
   update parameters of the recognition unit based on the recognition loss.

2. The learning device according to claim 1, wherein the one or more processors compute the intersection matrix based on a first prior distribution that is a rate that the recognition object data in the learning dataset belongs to each partial dataset, a second prior distribution that is a rate of each category included in the partial dataset, and a code indicating the responsible range assigned to each of the partial datasets.

3. The learning device according to claim 2, wherein the one or more processors are further configured to execute the instructions to:
   estimate the first prior distribution from the learning dataset; and
   estimate the second prior distribution from the learning dataset.

4. The learning device according to claim 2, wherein the the one or more processors compute a transition matrix using the first prior distribution, the second prior distribution, and the code indicating the responsible range, and compute the intersection matrix using an inverse matrix of the transition matrix.

5. The learning device according to claim 1, wherein the the one or more processors compute the recognition loss by weighting and adding losses between the recognition result for all the recognition object data included in the learning dataset and all the categories of the recognition objects using elements of the intersection matrix as weights.

6. A learning method using a learning dataset,
   the learning dataset including a plurality of partial datasets to which at least a part of all categories of recognition objects is assigned as a responsible range,
   all categories of the recognition objects being assigned to one of the plurality of partial datasets,
   each of recognition object data included in the partial dataset being given correct answer data indicating any one of the categories belonging to the responsible range of the partial dataset, or indicating that the category of the recognition object does not belong to the responsible range of the partial dataset,
   the learning method comprises:
   supplying the learning dataset;
   outputting a recognition result for the recognition object data in the supplied learning dataset;
   computing an intersection matrix based on the learning dataset;
   computing the recognition loss using the recognition result, the intersection matrix, and the correct answer data given to the recognition object data; and
   updating parameters of the recognition unit based on the recognition loss.

7. A non-transitory computer-readable recording medium for recording a program for a learning process using a learning dataset,
   the learning dataset including a plurality of partial datasets to which at least a part of all categories of recognition objects is assigned as a responsible range,
   all categories of the recognition objects being assigned to one of the plurality of partial datasets,
   each of recognition object data included in the partial dataset being given correct answer data indicating any one of the categories belonging to the responsible range of the partial dataset, or indicating that the category of the recognition object does not belong to the responsible range of the partial dataset,
   the learning process comprises:
   supplying the learning dataset;
   outputting a recognition result for the recognition object data in the supplied learning dataset;
   computing an intersection matrix based on the learning dataset;
   computing the recognition loss using the recognition result, the intersection matrix, and the correct answer data given to the recognition object data; and
   updating parameters of the recognition unit based on the recognition loss.

* * * * *